United States Patent Office 3,345,132
Patented Oct. 3, 1967

3,345,132
PROCESS OF PREPARING SILICIC ACID IN A TWO-DIMENSIONAL STRUCTURE
Gerhard Wulf, Grunstrasse 130, Duren, Rhineland, Germany
No Drawing. Filed June 3, 1965, Ser. No. 461,149
Claims priority, application Germany, June 3, 1964, W 36,914
8 Claims. (Cl. 23—182)

Silicon occurs in nature in combination with oxygen as silicon dioxide or silica, varieties of which are commonly known as quarz, flint, sand, rock crystals, agate and opal. It is also present in many natural silicate rocks. On the addition of any mineral acid to soluble orthosilicates, orthosilicic acid is formed, commonly called "silicic acid." Its general formula is $Si(OH)_4$. Silicic acid is a rather unstable substance which may be precipitated in a variety of different structures such as gelatinous silica, xerogel, polysilicic acid, or metasilicic acid, with the empirical formula of $H_2SiO_3$. By splitting off water from such substances they may be converted to high molecular anhydrides $SiO_2$ which are completely unsoluble and which, depending on conditions such as temperature, pH-value of the reaction medium, and concentration, have differing crystalline structure, such as network three-dimensional structures, laminated structure, and ring structure. One type of polymer silicic acid is lepidoid silicic acid which has a two-dimensional structure. The term "lepidoid," as used in the art, is a generic word for all chemical compounds wherein planar bonding predominates and two-dimensional network structures are formed. This lepidoid silicic acid is a rather special type of polymer silicic acid. Its crystalline structure is built up of siloxane bondings, the Si—O—Si period of which is 2.99 Angström units.

In this two dimensional structure, the unit cell contains six $SiO_2$ tetrahedra arranged at the corners of a regular hexagon. Each hexagonal ring is engaged to its juxtaposed rings by means of siloxane bonding. The oxygen atom of each said siloxane bondings is participating in two silicon hexagonal rings, with one valence electron of an oxygen atom for each ring. A ring structure with one valence electron of a bond oxygen atom included may be said to form the unit structure of the lepidoid silicic acid. This unit cell may be generally formulated for characterizing purposes in a manner as follows:

$$[(Si_6O_6)O_{6/2}](OH)_6$$

The structural elements within the brackets form the planar network structure. The positive valences of the Si atoms not contributing to said planar network structure are directed at right angles to the plane of the network. These extra positive valences are satisfied by the OH groups having the acidic H atom. The OH-groups are indicated by $(OH)_6$ in the above unit formula.

It is an object of the present invention to prepare a lepidoid silicic acid.

A further object of the invention is to show a new and effective process of preparing lepidoid silicic acid which is cheaper than known processes.

Another object of the invention is to use an acidic aqueous solution of a definite pH value in a process of producing lepidoid silicic acid.

Yet another object of the invention is to provide a process for preparing two-dimensional silicic acid, lepidoid, acid wherein a diluted aqueous solution of waterglass is added to a mineral acid aqueous solution of definite pH range in the order of from about pH 4.0 to about pH 5.6, and lepidoid silicic acid is formed under specified conditions of concentration, pH and reaction period by first freezing and then thawing the reaction solution.

Other objects and advantages of this invention will become apparent from the following description and appended claims.

According to the present invention, a new and unusually effective process of preparing lepidoid silicic acid has been found. According to the invention, it is preferred to mix a dilute waterglass solution into an aqueous sulfuric acid solution containing from about 10 percent by weight to about 50 percent by weight of concentrated sulfuric acid and to adjust the mixed solution to a pH-value between 4.0 and 5.6, preferably to a pH-value between 4.2 and 4.9. Then, the solution is held at the predetermined pH-value and frozen. Thereafter, the frozen product is melted. Following melting, the desired lepidoid silicic acid is separated. Particles having an average size of several microns, or of several tens of microns increasing with the length of the freezing period are achieved.

It has proved useful to start with a highly diluted waterglass solution which preferably consists of alkali metal silicate and water in a ratio of between 1:1 and 1:30, and preferably of between 1:7 and 1:12.

While in known processes for preparing lepidoid silicic acid there is a process step of building a Graham sol by dialysis, this step is avoided in the instant process. Therefore, the new process of the present invention is a great improvement over the art. It is a feasible process for the industrial production of lepidoid silicic acid from silicates.

Lepidoid silicic acid produced according to the present invention has an exceptionally large BET-surface area of about 640 m.² per g. This results in excellent filtering characteristics. Lepidoid silicic acid produced by the present invention is highly reactive and is thus useful for all processes wherein active silica is usually used. Since the process of the invention can be economically practiced, there is no bar against using the product resulting therefrom for any application where precipitated amorphous silica, has heretofore been used.

According to the present invention, diluted waterglass solution is introduced into a mineral acid such as sulfuric acid, and the resulting mixture is agitated. The waterglass solution is preferably diluted in a manner such that no gel particles precipitate on introducing the solution into the acid. There will never be any flocculent precipitate present when the waterglass solution used has been diluted with water to a silicate to water ratio of about 1:9.

The amount of waterglass solution used in the process of the invention for mixing with the mineral acid is controlled to give a mixture from pH-value of preferably from 4.4 to 4.8. This range of pH values, 4.4 to 4.8, is within the previously given range, 4.2 to 4.9, and represents an especially preferred range. Such a pH-value is equal to the pH of a pure silicic acid sol in water of neutral pH.

The said mixture, after having been adjusted to the desired pH, is then frozen. On thawing, there remains as a solid the desired lepidoid silicic acid which may be easily filtered off and which may be freed of any electrolyte impurities by washing with water. While the BET-surface area of said lepidoid silicic acid produced according to the present invention amounts to about 640 m.² per g., the average particle size of said product may be varied according to the rate of freezing. Lepidoid silicic acid having average particle sizes of less than 1 micron is obtained if the freezing rate is high—thus if freezing is complete in a period of some seconds. When freezing takes about 1 to 3 minutes, a product having an average particle size of about 1 to 3 microns results. Products with particles in the range of 40 to 100 microns are obtained by freezing the mixed solution over a period of about ten hours and more. To obtain these larger particles, a freezing time of at least 12 hours is preferred. As can be seen, it is possible to regulate the size of the product produced in accordance with the intended application.

The pH range in which the reaction mixture is held while being frozen is a highly critically one. If such pH value is about 2, an insoluble residue of pure silica gel is obtained on thawing.

If solutions are frozen having hydrogen ion concentrations above pH 2 and up to pH 4, clear solutions are obtained on thawing. There is no silicic acid precipitate. If, in accordance with the invention, a mixture with a pH over 4 and particularly with a pH value from 4.5 to 4.8 is frozen and thawed, the desired pure lepidoid silicic acid is obtained.

Solutions having pH values above about 4.9 give a sol, on freezing and thawing. This sol is stable only for a short time and is then precipitated as a gel, the stability of the sol falling rapidly with increasing pH value. At these higher pH values, if this gel formation is to be avoided, it is necessary to freeze the mixture very rapidly.

In the case of mixtures having a pH value of more than 5.6, silicic acid gel is precipitated so quickly that the manufacture of lepidoid silicic acid is virtually impossible.

The above information shows that in the method of the invention, an exact adjustment of the hydrogen ion concentration in the mixture from which the lepidoid silicic acid is to be frozen out is essential. Mixtures with pH values of above pH 5.6 and below about pH 2 do not yield lepidoid silicic acid. Rather, products of a completely different chemical structure are obtained.

The two-dimensional silicic acid manufactured in accordance with the invention has innumerable possible uses. These arise for the following reasons: it has a very large surface area per unit weight; it can be readily manufactured at high purity; it is characterised by a high chemical reactivity; and, by slight variations in the method of the invention, its average particle size ranges from less than 1 micron up to 100 microns. This silicic acid can be used, for instance, for manufacturing various two-dimensional base metal silicates (i.e. those of Mg, Ca, Sr, Ba, Cu, Ni, Zn) up to the stoichiometric ratio of metal: Si of 1:1. These base-metal silicates can be used as active paper and rubber fillers or, if required after reduction, as catalysts with an extremely active surface. Furthermore, the silicic acid manufactured according to the invention is suitable for all purposes for which an absolutely electrolyte-free silicic acid is necessary.

The lepidoid silicic acid made according to the invention is readily soluble in cold potassium hydroxide solution and can therefore serve for the manufacture of very pure potassium water-glasses such as are necessary in the manufacture of Braunian tubes (television tubes).

Also, the two-dimensional silicic acid made according to the invention is suitable as a carrier for instecticides, as a filtration aid, as filter media for beverages, e.g. beer, as a filler for plastic materials, as partition agents for the preparation of casting moulds, as heat insulation materials, as ceramic materials for the manufacture of special glasses, as aids in the pharmaceutical and cosmetic industries and as absorption media, e.g. in connection with organic solvents in stain-removing pastes.

The following examples are submitted as additional illustrations of the invention. These examples shown several variations in processing along the lines of present invention. The proportions given in these examples, unless otherwise specified, are on a weight basis. While sulphuric acid is used in each example, it is to be understood that other mono-basic or poly-basic acids can be used. It is to be understood that the examples are not intended to limit the invention and changes, omissions, additions, substitutions and/or modifications might be made without departing from the spirit of the invention.

EXAMPLE 1

Water-glass (37–40° Bé., 28% $SiO_2$, 8% $Na_2O$) was diluted with water in the ratio of 1:9. This solution was added to half-concentrated hydrochloric acid, with stirring. During the stirring, the pH of the reaction mixture was measured with a pH meter. At pH 4.6, addition of the diluted water-glass solution was stopped. The mixture was then slowly frozen in a refrigerator plant. After thawing of the ice block so formed, insoluble lepidoid silicic acid remained, which was readily washed pure after filtration.

EXAMPLE 2

Operation proceeded as described in Example 1, with the difference that 48% sulphuric acid was used instead of hydrochloric acid. Sodium sulphate was thus produced in the mixture, which precipitates at −3° C. with water as an eutectic mixture, and so freezing was carried out very economically and rapidly, advantageously in the presence of sodium chloride, as in Example 1. The BET surface of the silicic acid obtained amounted to 636 $m.^2/g.$, the average particle size being 40 to $100\mu$, using a freezing rate of about 12 hours.

EXAMPLE 3

Operation proceeded as in Example 2, except that, instead of 48% sulphuric acid, 20% sulphuric acid was used. Results corresponded to those described in Example 2.

EXAMPLE 4

Operation proceeded as in Example 3 and a mixed solution having a pH of 4.6 was frozen at various speeds, as follows:

(a) in 30 seconds,
(b) in 2 minutes,
(c) in 12 hours.

The silicic acid produced had similar surfaces, viz. a BET surface of about 600 $m.^2/g$. About 80% by weight of the particles had an average particle size as follows:

Operation (a)—below $1\mu$,
Operation (b)—$1$–$2\mu$,
Operation (c)—$40$–$100\mu$.

It will be seen that the average particle size is markedly dependent upon the velocity of freezing.

EXAMPLE 5

In this example, an atempt was made to find to what extent far dilution of the initial water-glass mixture and the pH value of the frozen solution affect the properties of the end product. In this test, in all cases 48% sulphuric acid was used.

*(a) Use of 1:1 diluted water-glass*

When this water-glass solution was stirred into the sulphuric acid, even with rigorous stirring much gel flocking was obtained in the mixture. Freezing at pH 2 gave, after thawing, a solid residue of silicic acid gel, which only slightly resembled the gel particles obtained previously. At higher pH values, the mixture hardened before being frozen so as to form a gel instantaneously.

*(b) Use of 1:2 diluted water-glass*

If this water-glass solution is added to the sulphuric acid, again much gel flocking is obtained in the mixture. Freezing and thawing at pH 2 give gel particles exclusively. At a pH value of 2.7, a silica gel is likewise obtained on freezing. At pH 3.7, the mixture sets rapidly to a gel so that only freezing of the gel is possible.

*(c) Use of 1:3 diluted water-glass*

If this water-glass solution is added to sulphuric acid, the mixture remains clear at a pH up to 4.6. Only slight flocking occurs. At this pH value, the mixture must be frozen very rapidly as otherwise it hardens to a gel after 5 minutes.

After freezing and thawing there was obtained:

At pH 2.0—a gel,
At pH 2.7—again a clear solution,
At pH 3.7—a clear solution which hardened to a gel after about 30 minutes,
At pH 4.6—two-dimensional silicic acid mixed with some gel particles.

(d) *Use of 1:5 diluted water-glass*

If this water-glass solution is stirred into the sulphuric acid, the mixture remains clear up to a pH value of 4.6 and contains slight gel flock particles. The mixture is stable as a sol for 15 minutes before being gelled.

After freezing and thawing, there was obtained:

At pH 2.0—a pure gel,
At pH 2.7—a clear solution,
At pH 3.7—a clear solution,
At pH 4.6—two-dimensional silicic acid with some gel particles which could be readily released on rapid stirring.

(e) *Use of 1:7 diluted water-glass solution*

If this water-glass solution is added to the acid, the mixture remains clear up to a pH value of 4.6 and contains very slight gel flocking. The mixture is stable for about 20 minutes as a sol. After freezing and thawing, there was obtained:

At pH 2.0—pure gel,
At pH 2.7—a clear solution,
At pH 3.7—a clear solution,
At pH 4.6—two-dimensional silicic acid.

(f) *Use of 1:9 diluted water-glass solution*

On adding this water-glass solution to the acid, the mixture remains absolutely clear to a pH of 4.6 and contains no gel flocking. Since in this test the electrolyte content of the mixture is lower than in the other tests, this sol remained stable for several hours. After freezing and thawing there was obtained:

At pH 2.0—pure gel,
At pH 2.7—a clear solution,
At pH 3.7—a clear solution,
At pH 4.6—two-dimensional silicic acid.

EXAMPLE 6

1:9 diluted water-glass solution was poured into 20% sulphuric acid. Depending on adjustment of the pH value of the mixed solution used for freezing, there was obtained after freezing and thawing the following:

(a) At pH 4.0—a clear solution
(b) At pH 4.2—a clear solution
(c) At pH 4.4—some two-dimensional silicic acid
(d) At pH 4.5—two-dimensional silicic acid in quantitative yields
(e) At pH 4.6—as in (d)
(f) At pH 4.7—as in (d)
(g) At pH 4.8—as in (d)
(h) At pH 4.9—as in (d)
(i) At pH 5.0—as in (d)
(k) At pH 5.1—as in (d)
(l) At pH 5.2—as in (d)
(m) At pH 5.4—as in (d)
(n) At pH 5.6—as in (d)

The solution with a pH of 5.6 formed a sol which gelled after 5 minutes, so that it had to be frozen very rapidly. The solution with a pH of 5.4 gelled after 20 minutes, the solution with a pH of 5.2 gelled after 45 minutes and the solution with a pH of 5.0 gelled after 150 minutes, forming undesirable silica gel.

Solution with pH between 4.5 and 4.8 form sols which remain stable for many hours.

I claim:

1. A process of manufacturing silicic acid into a predominantly planarly bonded two-dimensional structure as lepidoid silicic acid, comprising the steps of: preparing an aqueous solution of an alkali metal silicate, the ratio of said silicate and water being from 1:7 to 1:12; adding said solution to an aqueous, diluted sulphuric acid solution having a pH value in the range between 4.2 to 4.9; mixing both solutions; freezing the mixture within a time of up to 30 seconds; thawing the frozen mixture and recovering the remaining lepidoid silicic acid in form of a solid product having an average particle size of less than 1 micron.

2. A process of preparing silicic acid into a predominantly planarly bonded, two-dimensional structure, comprising the steps of: preparing an aqueous solution of an alkali metal silicate wherein the ratio of said silicate to water ranges between 1:1 and 1:30; adding said solution to an aqueous solution of sulphuric acid having a pH value between 4.0 and 5.6; thoroughly mixing both solutions; freezing the mixture within several seconds; thereafter thawing the frozen mass and collecting the lepidoid silicic acid remaining as a solid mass of separated particles having an average diameter less than 1 micron.

3. A process of manufacturing two-dimensional, predominantly planarly bonded lepidoid silicic acid, comprising the steps of: adding an aqueous solution of an alkali metal silicate having 1 part by weight of said silicate for each 7 to 12 parts by weight of water to an aqueous sulphuric acid solution having a pH between 4.2 and 4.9; thoroughly mixing the solutions; bringing the resulting mixture to a completely frozen condition in a time of at least 12 hours; thereafter thawing the frozen mixture and collecting the solid particles of lepidoid silicic acid having an average particle size between 40 and 100 microns.

4. A process of preparing silicic acid in a two-dimensional, predominantly planarly bonded structure as lepidoid silicic acid, comprising the steps of: mixing an aqueous solution of an alkali metal silicate, wherein the ratio of said silicate to water amount to between 1:1 and 1:30, into a solution of sulphuric acid and water; the pH of said sulphuric solution being between 4.0 and 5.6; freezing said mixed solutions within a period of between two and 5 days, thereafter melting the mixture and recovering the produced lepidoid silicic acid product in the form of small particles having an average diameter between 40 and 100 microns.

5. A process of manufacturing silicic acid in a two-dimensional, predominantly planarly bonded structure as lepidoid silicic acid, comprising the steps of: preparing an aqueous solution of an alkali metal silicate, the ratio of said silicate and water being from 1:7 to 1:12; adding said solution to an aqueous diluted mineral acid solution having a pH value in the range between 4.2 to 4.9; mixing both solutions; freezing the resulting mixture in a time of up to 30 seconds; then thawing the frozen mixture and recovering the remaining lepidoid silicic acid in form of a solid product having an average particle size of less than 1 micron.

6. A process of preparing silicic acid in a two-dimensional, predominantly planarly bonded structure, comprising the steps of: preparing an aqueous solution of an alkali metal silicate wherein the ratio of said silicate to water is between 1:1 and 1:30; adding said solution to an aqueous solution of mineral acid having a pH value between 4.0 and 5.6; thoroughly mixing both solutions; freezing the resulting mixture within several seconds; thereafter thawing the frozen mixture and collecting lepidoid silicic acid remaining as a solid mass of individual particles having an average diameter less than 1 micron.

7. A process of manufacturing two-dimensional, predominantly planarly bonded lepidoid silicic acid, comprising the steps of: adding an aqueous solution of an alkali metal silicate having 1 part by weight of said silicate for each 7 to 12 parts by weight of water to an aqueous acid solution having a pH between 4.2 to 4.9; thoroughly mixing the solutions; bringing the resulting mixture to a completely frozen condition in a time of at least 12 hours; thereafter thawing the mixture and collecting the solid particles of lepidoid silicic acid having an average particle size between 40 and 100 microns.

8. A process of preparing silicic acid in a two-dimensional, predominantly planarly bonded structure as lepidoid silicic acid, comprising the steps of: mixing an aqueous solution of an alkali metal silicate wherein the ratio of said silicate to water amounts to between 1:1 and 1:30, into a solution of an acid in water; the pH of said acid solution being between 4.0 and 5.6; freezing said mixed solutions within a period between 2 and 5 days; and then melting the mixture and recovering the lepidoid silicic acid product in the form of small particles having an average diameter between 40 and 100 microns.

References Cited

UNITED STATES PATENTS 2,561,304   7/1951   Hazel _____ 23—182

OSCAR R. VERTIZ, *Primary Examiner.*

A. GREIF, *Assistant Examiner.*